Oct. 4, 1927.
D. W. LONGFELLOW
1,644,196
REENFORCED CONCRETE PIPE
Filed March 9, 1925
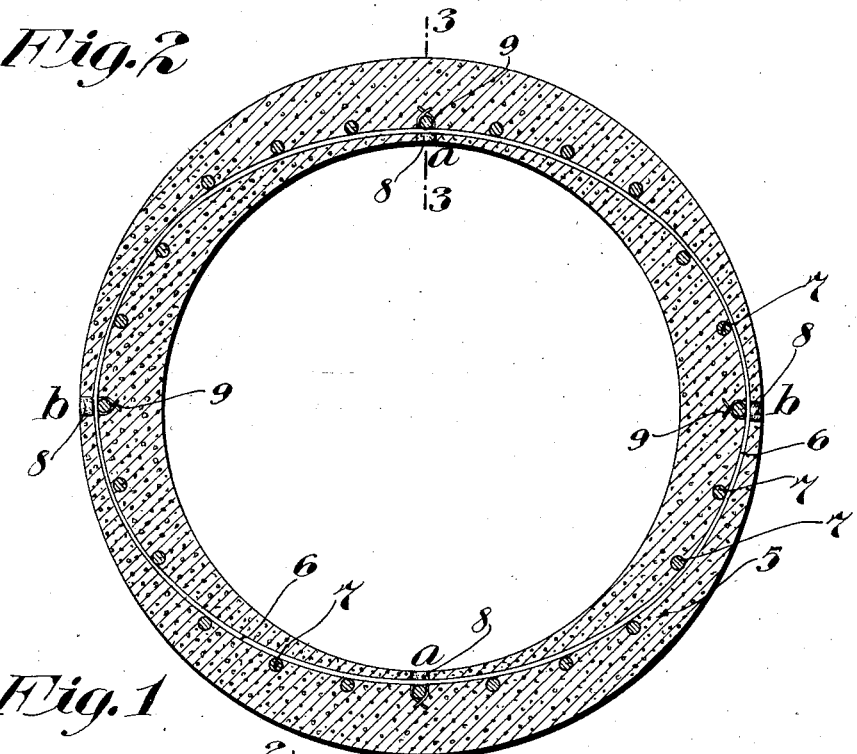
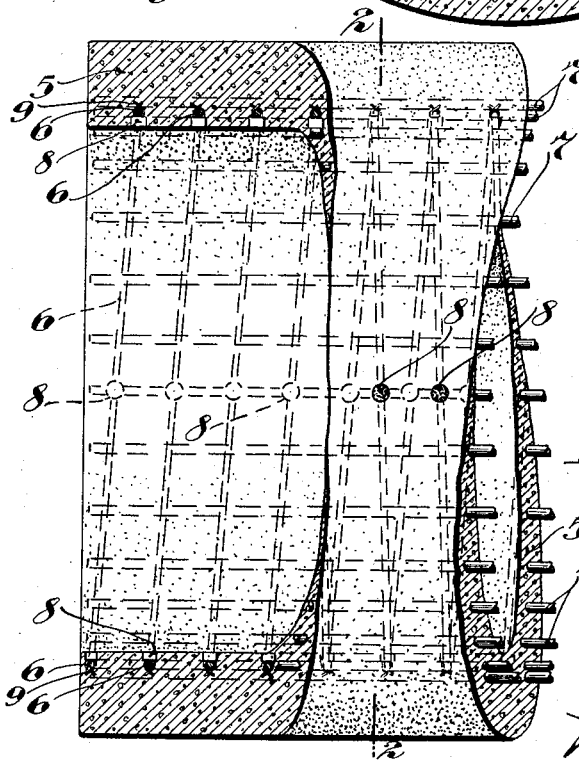
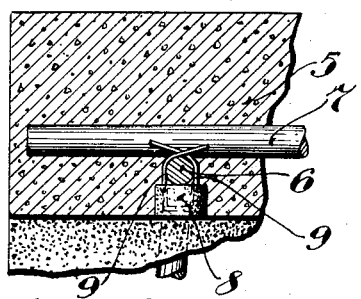
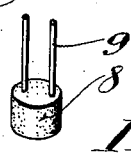
Inventor
Dwight W. Longfellow
By his Attorneys Patented Oct. 4, 1927.

1,644,196

UNITED STATES PATENT OFFICE.

DWIGHT W. LONGFELLOW, OF ELK RIVER, MINNESOTA, ASSIGNOR TO ELK RIVER CONCRETE PRODUCTS COMPANY, OF ELK RIVER, MINNESOTA, A CORPORATION OF MINNESOTA.

REENFORCED-CONCRETE PIPE.

Application filed March 9, 1925. Serial No. 14,062.

My invention relates to concrete pipes such as used for culverts, sewers and drains, and especially for those that are of large diameter which are embedded in the ground and are subject to very considerable crushing strains.

Generally stated, the invention consists of the novel construction, combinations and arrangements of parts hereinafter described and defined in the claim.

More particularly stated, the invention relates to the manner of applying a metallic reenforcement in concrete pipes, whereby reenforcement is given the greatest efficiency to resist crushing strain on the pipe, and in connection therewith of certain devices that serve not only as spacers but as markers so that in laying the pipe, the major as well as the minor axes of the reenforcement may be quickly ascertained and the pipe set with its reenforcement properly arranged to resist crushing strain.

In practice it is much easier to manufacture a round or cylindrical concrete pipe than it is to make a pipe of any cross sectional form; and in practice it is demonstrated that embedded circular metal reenforcements for cylindrical pipes to have greatest efficiency must be elliptical. This relative arrangement of cylindrical concrete pipe and elliptical reenforcement is here taken advantage of and utilize markers also as spacing devices for the metal reenforcement, but this is a matter that will be made clear in the following description in connection with the accompanying drawings wherein like characters indicate like parts throughout the several views:

Referring to the drawings:

Fig. 1 is a view partly in plan and partly in horizontal section showing a portion of concrete pipe such as used for culverts or large sewers and illustrating my invention incorporated therein;

Fig. 2 is a transverse section on the line 2—2 of Fig. 1;

Fig. 3 is an enlarged fragmentary section on the line 3—3 of Fig. 2; and

Fig. 4 is a perspective showing one of the combined spacers and markers.

The cylindrical concrete pipe is indicated as an entirety by the numeral 5. The elliptical reenforcement, as shown, is made up of a spiral rod or heavy wire 6 and a longitudinal rod 7, the said elements 6 and 7 forming a skeleton reenforcement that is elliptical in cross section and which, of course, is embedded in the concrete of the pipe.

Concrete, as is well known, is strong in compression but weak in tension and hence when a pipe such as shown in Fig. 2 is subjected to downward crushing strain there will be four weak points where breaks or cracks will first be produced. Two of these points $a$—$a$ are on the vertical axis of the cross section of the pipe and at the inner surface thereof while two other breaking points $b$—$b$ are on the horizontal axis of the cross section of the pipe and at the exterior thereof. Hence, to render the metal reenforcement most efficient in tension it is layed in the concrete so that it will closely approach the surface of the pipe at the said four points $a$—$a$ and $b$—$b$.

For spacing the metal reenforcement so that it will be embedded in the concrete pipe at the said points $a$—$a$ and $b$—$b$ only slightly, say one inch or less, I provide spacing blocks 8 preferably made of concrete or cement and as shown of cylindrical form; but, of course, they may take other forms. A U-shaped wire 9 is cast or partly embedded in each block 8 with its ends projected. These spacers are placed so that the vertically aligned blocks will be exposed against the inner form and the horizontally aligned blocks 8 are placed so that they will be exposed against the outer form of the pipe casting mold, not shown, and they are held in such positions by twisting the ends of the wires 9 around adjacent reenforcing rods 7. In addition to the above noted spacing function, the blocks 8 serve as markers which may be seen in the finished pipe. The two blocks 8 exposed at the exterior of the pipe will indicate the horizontal axis of the cross section of the pipe and the major axis of the cross section of the elliptical metal reenforcement, and the blocks 8 exposed at the interior of the pipe will indicate the vertical axis of the cross section of the pipe and the minor axis of the cross section of the elliptical reenforcement. These combined spacers and markers, therefore, enable the person laying the pipe to place the same so that the elliptical metallic reenforcement will be set for maximum efficiency to resist strains that may tend to crush the pipe.

Of course, in the direction longitudinally of the pipe, any desired number, but preferably a large number, of the said blocks 8 will be employed. I prefer to make the blocks 8 of concrete or cement, and even when made without coloring matter they may be quite readily seen, but said blocks may be made of other material and if desired may be colored or at least some thereof may be colored to make them more clearly visible.

From what has been said it may be understood that the structure described is capable of modification within the scope of the claim herein.

While the invention relates particularly to concrete pipes it may be incorporated in pipes made of any moldable material that is initially plastic but which hardens when set or baked. From this statement it of course follows that the pipe may be made of baked clay or the like.

In the claim the term "concrete" is used in a liberal sense and it will be understood that any initially plastic or moldable material will be the equivalent thereof as far as this invention is concerned and within the scope of the claim hereof.

From what has been said, it, of course, follows that the metallic reenforcement may take various forms. In fact, any of the many well known commercial woven wire fabrics may be used. All that is highly desirable is that the reenforcing wires should be so disposed as to give both longitudinal and circumferential reenforcement. However, the circumferential reenforcement is the vital thing and the longitudinal reenforcement is a secondary matter.

What I claim is:

A concrete pipe having a truly cylindrical cross section and imbedded in said pipe a metallic reenforcement of elliptical form so disposed as to closely approach the interior of the pipe at the vertical axis of its cross section and to closely approach the exterior of the pipe at the horizontal axis of its cross section, and combined spacing and marking blocks imbedded in the pipe at certain points where the reenforcement most closely approaches the surface of the pipe, some of said combined spacing and marking devices being at the exterior and some at the interior thereof.

In testimony whereof I affix my signature.

DWIGHT W. LONGFELLOW.